(12) United States Patent
Watanabe

(10) Patent No.: US 9,940,908 B2
(45) Date of Patent: Apr. 10, 2018

(54) DISPLAY CONTROL DEVICE

(71) Applicant: AISIN SEIKI KABUSHIKI KAISHA, Kariya-shi, Aichi-ken (JP)

(72) Inventor: Kazuya Watanabe, Anjo (JP)

(73) Assignee: AISIN SEIKI KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/278,620

(22) Filed: Sep. 28, 2016

(65) Prior Publication Data

US 2017/0092234 A1    Mar. 30, 2017

(30) Foreign Application Priority Data

Sep. 29, 2015 (JP) ................ 2015-192157
Sep. 29, 2015 (JP) ................ 2015-192173

(51) Int. Cl.

| | | |
|---|---|---|
| G09G 5/377 | (2006.01) | |
| G06F 3/0482 | (2013.01) | |
| G06F 3/0485 | (2013.01) | |
| G08G 1/16 | (2006.01) | |
| B60R 1/00 | (2006.01) | |
| G06F 3/0484 | (2013.01) | |

(52) U.S. Cl.
CPC ............ *G09G 5/377* (2013.01); *B60R 1/00* (2013.01); *G06F 3/0482* (2013.01); *G06F 3/04845* (2013.01); *G08G 1/16* (2013.01); *B60R 2300/202* (2013.01); *B60R 2300/607* (2013.01); *B60R 2300/802* (2013.01); *G06T 2207/20221* (2013.01); *G08G 1/168* (2013.01); *G09G 2380/10* (2013.01)

(58) Field of Classification Search
None
See application file for complete search history.

(56) References Cited

U.S. PATENT DOCUMENTS

2005/0074143 A1    4/2005    Kawai

FOREIGN PATENT DOCUMENTS

| JP | 2005-112004 A | 4/2005 |
|---|---|---|
| JP | 2012-001126 A | 1/2012 |

*Primary Examiner* — Ke Xiao
*Assistant Examiner* — Jed-Justin Imperial
(74) *Attorney, Agent, or Firm* — Sughrue Mion, PLLC

(57) ABSTRACT

A display control device includes: an increase and decrease instruction acquisition unit that acquires an increase instruction or a decrease instruction to increase or decrease a blind area in which a surroundings image is not displayed in a synthesized image including a vehicle image which is an image of a vehicle and the surroundings image which is an image of the surroundings of the vehicle; a blind area generation unit that increases or decreases the blind area based on the increase instruction or the decrease instruction; and a synthesized image generation unit that generates a synthesized image including the blind area, the vehicle image, and the surroundings image.

16 Claims, 9 Drawing Sheets

DISPLAY CONTROL DEVICE

CROSS REFERENCE TO RELATED APPLICATIONS

This application is based on and claims priority under 35 U.S.C. § 119 to Japanese Patent Applications 2015-192173 and 2015-192157, both filed on Sep. 29, 2015, the entire contents of which are incorporated herein by reference.

TECHNICAL FIELD

This disclosure relates to a display control device.

BACKGROUND DISCUSSION

In the related art, as a display control device mounted on a vehicle such as an automobile, a display control device is known, which causes an image including an image of a vehicle or surroundings of the vehicle to be displayed on a display device based on images captured by an imaging device such as a camera.

JP 2005-112004A is an example of the related art.

Here, for example, in a case where a component such as a winch is added to the rear part of a vehicle, the winch is within an imaging range of an imaging device, and thus, a blind area of the imaging device where the imaging device cannot capture a surroundings image increases. In addition, it can be considered that there may be a case where a user wants to change the blind area at the user's preference or to decrease the blind area up to an actually visible limit area rather than the blind area in the design depending on the mounting state of the camera. However, in the technology described above, there is a problem in that it is not possible to cause the displayed image to respond to the increase of the blind area.

SUMMARY

A display control device according to an aspect of this disclosure includes: an increase and decrease instruction acquisition unit that acquires an increase instruction or a decrease instruction to increase or decrease a blind area in which a surroundings image is not displayed in a synthesized image including a vehicle image which is an image of a vehicle and the surroundings image which is an image of the surroundings of the vehicle; a blind area generation unit that increases or decreases the blind area based on the increase instruction or the decrease instruction; and a synthesized image generation unit that generates a synthesized image including the blind area, the vehicle image, and the surroundings image.

The display control device according to the aspect of this disclosure can adjust the blind area by increasing or decreasing the blind area based on the increase instruction or the decrease instruction. Therefore, it is possible to respond to the increase of the blind area due to the winch or the like added to the rear part of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Exemplary embodiments and modification examples described hereinafter will include the same configuration elements. Accordingly, hereinafter, the same reference signs will be given to the same configuration elements and the description thereof will not be repeated. Portions included in an embodiment or a modification example can be configured by being replaced with a corresponding portion of another embodiment or modification example. In addition, the configuration or a position included in the embodiment or the modification example is similar to those in another embodiment or modification example unless otherwise stated.

First Embodiment

Figure 1:
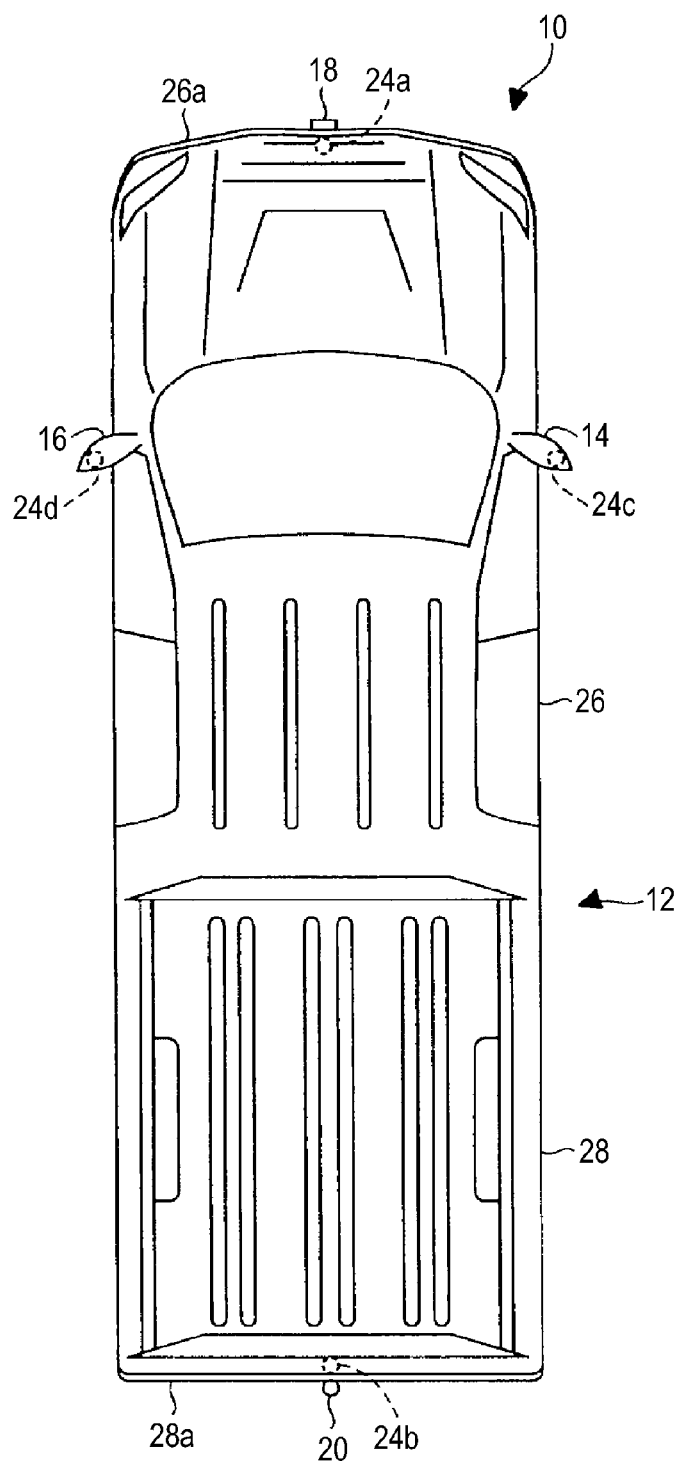
FIG. 1 is a plan view illustrating a vehicle in a first embodiment.

FIG. 1 is a plan view illustrating a vehicle 10 in a first embodiment. As illustrated in FIG. 1, an example of the vehicle 10 is a pickup truck type vehicle. The vehicle 10 may be a vehicle other than the pickup truck type vehicle. The vehicle 10 includes a vehicle body 12, a winch 18, a trailer hitch 20, and a plurality of imaging units 24.

The vehicle body 12 includes a pair of mirrors 14 and 16, a cabin section 26, and a cargo section 28. The cabin section 26 includes, for example, a riding space that can accommodate multiple persons. A bumper 26a is provided at a front end portion of the cabin section 26. The cargo section 28 is provided at the rear portion of the cabin section 26. A bumper 28a is provided at a rear end portion of the cargo section 28. The cargo section 28 is open to the outside such that cargo or the like can easily be loaded. The pair of mirrors 14 and 16 is provided at the center of the vehicle body 12 in a longitudinal direction. One mirror 14 is provided at the right side of the vehicle body 12. The other mirror 16 is provided at the left side of the vehicle body 12.

The winch 18 winds a rope that is connected to another vehicle or the like. The winch 18 is provided at, for example, the front end portion and a center portion of the vehicle body 12 in a lateral direction.

The trailer hitch 20 is connected to another separated trailer or the like and pulls the trailer. The trailer hitch 20 is provided at, for example, the rear end portion and a center portion of the vehicle body 12 in a lateral direction.

The number of imaging units 24 is, for example, four. In a case where the four imaging units are needed to be distinguished, the reference signs of the units are 24a, 24b, 24c, and 24d respectively. The imaging unit 24 is a digital camera in which, for example, an imaging element such as a charge coupled device (CCD) or a CMOS image sensor (CIS) is incorporated. The imaging unit 24 images the surrounding situation of the vehicle 10 in a wide angle. For example, the imaging unit 24 images the surroundings in a wide angle equal to or greater than 180°. The imaging unit 24 images the surrounding situation of the vehicle 10 and converts the image into electrical image data and outputs the result.

The imaging unit 24a is provided at the front end portion and the center portion of the vehicle body 12 in the lateral direction. The imaging unit 24a is directed forward and obliquely downward direction. The imaging unit 24a images the surrounding situation including a road surface in front of the vehicle 10. The imaging unit 24a is provided at an upper portion of the winch 18. Therefore, the winch 18 is included in the image captured by the imaging unit 24a.

The imaging unit 24b is provided at the rear end portion and the center portion of the vehicle body 12 in the lateral direction. The imaging unit 24b is directed rearward and obliquely downward direction. The imaging unit 24b images the surrounding situation including a road surface at the rear of the vehicle 10. The imaging unit 24b is provided at an upper portion of the trailer hitch 20. Therefore, the trailer hitch 20 is included in the image captured by the imaging unit 24b.

The imaging unit 24c is provided at the center portion in the longitudinal direction and the right side of the vehicle body 12. The imaging unit 24c is provided, for example, on the mirrors 14. The imaging unit 24c is directed toward the right direction and obliquely downward direction. The imaging unit 24c images the surrounding situation including a road surface at the right side of the vehicle 10.

The imaging unit 24d is provided at the center portion in the longitudinal direction and the left side of the vehicle body 12. The imaging unit 24d is provided, for example, on the mirrors 16. The imaging unit 24d is directed toward the left direction and obliquely downward direction. The imaging unit 24d images the surrounding situation including a road surface at the left side of the vehicle 10.

Figure 2:
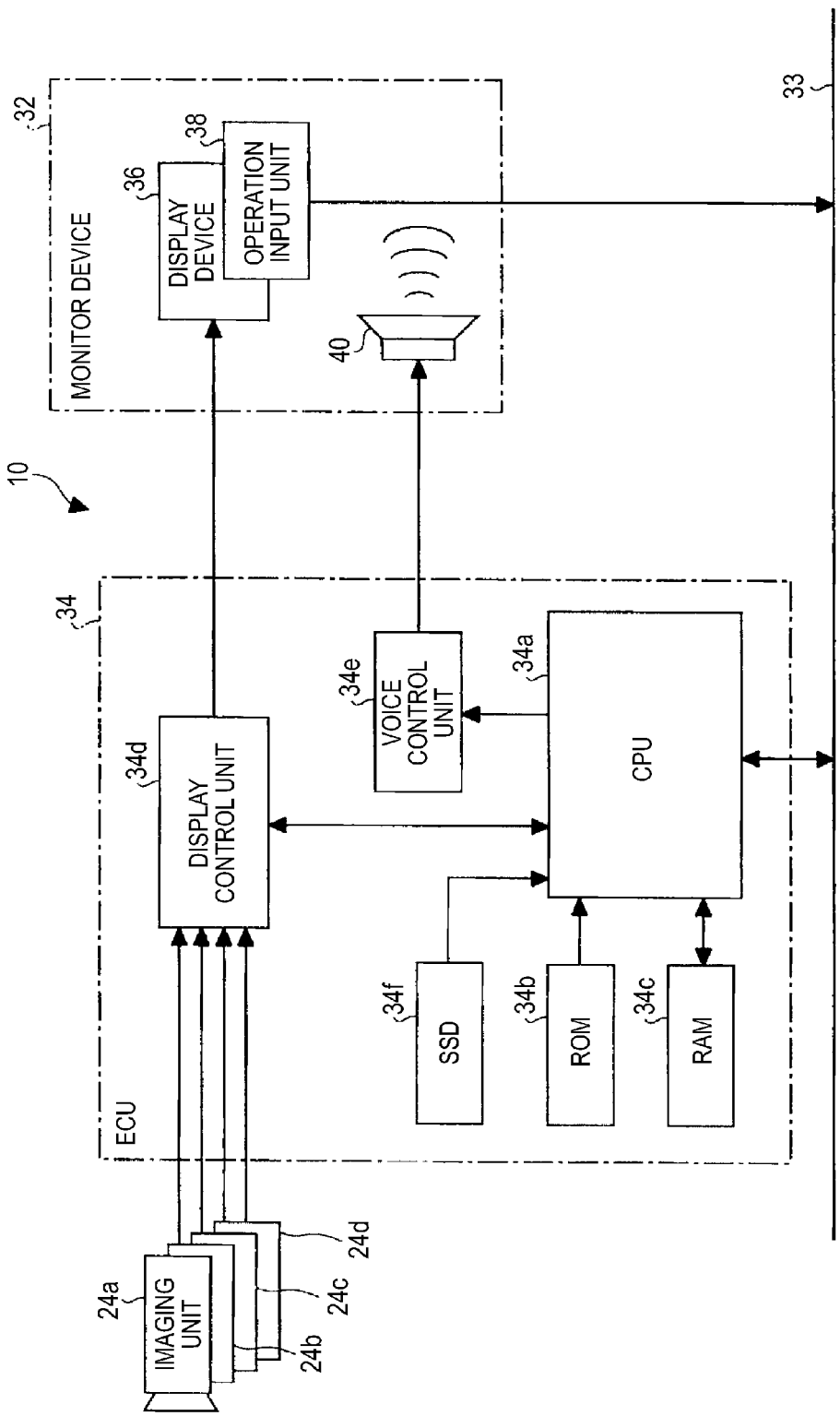
FIG. 2 is a block diagram illustrating an example of a control system of the vehicle in the first embodiment.

FIG. 2 is a block diagram illustrating an example of the control system of the vehicle 10 in the first embodiment. As illustrated in FIG. 2, the vehicle 10 includes a monitor device 32 and an ECU 34 which is an example of a display control device.

The monitor device 32 and the ECU34 are electrically connected to each other via an in-vehicle network 33 as an electric communication line. The in-vehicle network 33 is configured as, for example, a controller area network (CAN).

The monitor device 32 is provided on a dashboard or the like in the vehicle body 12. The monitor device 32 includes a display device 36 and an operation input unit 38.

The display device 36 displays images such as still images and moving images. An example of the display device 36 includes a liquid crystal display. The display device 36 displays the images based on image data output from the ECU 34.

The operation input unit 38 acquires a user's input and outputs the input to the ECU34. An example of the operation input unit 38 includes a touch panel. The operation input unit 38 is disposed on the screen on which the images on the display device 36 are displayed.

The ECU34 can control the display control unit 34d, the display device 36, and the like by sending a control signal through the in-vehicle network 33. In addition, the ECU 34 can receive an operation signal from the operation input unit 38 via the in-vehicle network 33.

The ECU 34 includes, for example, a central processing unit (CPU) 34a, a read only memory (ROM) 34b, a random access memory (RAM) 34c, the display control unit 34d, a voice control unit 34e, a solid state drive (SSD, flash memory) 34f, and the like. The CPU 34a can perform, for example, various calculation processing items and controls for image processing related to the images displayed on the display device 36. The CPU 34a can read out programs installed and stored in a non-volatile storage device such as the ROM 34b, and can perform the calculation processing according to the program. The RAM 34c temporarily stores various data items used for the calculation in the CPU 34a.

The display control unit 34d mainly performs the image processing using the image data obtained from the imaging unit 24 and a synthesis of the image data to be displayed on the display device 36 among the calculation processing items in the ECU 34. The voice control unit 34e mainly performs processing of voice data output from a voice output device 40 among the calculation processing items in the ECU 34. The SSD 34f is a rewritable non-volatile storage unit and can store the data even in a case where the power source of the ECU 34 is in an OFF state. The CPU 34a, the ROM 34b, and the RAM 34c are integrated in one package. In addition, the ECU 34 may be configured using another logical calculation processor or a logic circuit such as a digital signal processor (DSP) instead of the CPU 34a. In addition, a hard disk drive (HDD) may be provided instead of the SSD 34f. The SSD 34f and the HDD may be provided separately from the ECU 34.

In the first embodiment, the ECU 34 can realize at least a part of the functions of the display control device due to cooperation of hardware and software (control program).

Figure 3:
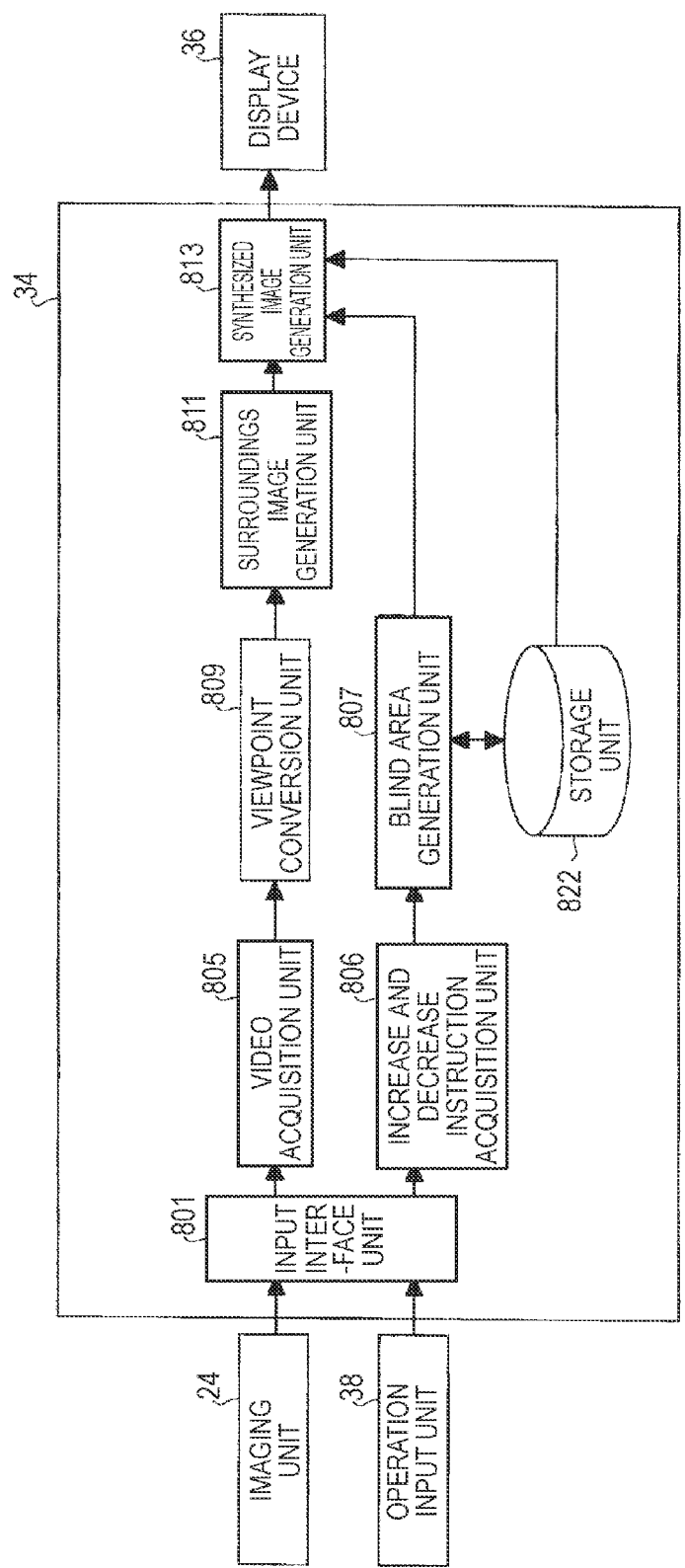
FIG. 3 is a functional block diagram illustrating a configuration of an ECU in the first embodiment.

FIG. 3 is a functional block diagram illustrating the configuration of the ECU 34 in the first embodiment. The ECU 34 is an example of the display control device. As illustrated in FIG. 3, in the ECU 34, the CPU 34a configured as the ECU 34 executes the software stored in the ROM 34b or the SSD 34f. In this way, the ECU 34 realizes an input interface unit 801, a video acquisition unit 805, a viewpoint conversion unit 809, a surroundings image generation unit 811, an increase and decrease instruction acquisition unit 806, a blind area generation unit 807, a synthesized image generation unit 813, and a storage unit 822.

The input interface unit 801 performs the processing of inputting the captured image data from the imaging unit 24 and the instruction data from the operation input unit 38.

The video acquisition unit 805 acquires the captured image data captured by the imaging unit 24 and outputs the image data to the viewpoint conversion unit 809. The viewpoint conversion unit 809 converts a viewpoint of the captured image data generated by the imaging unit 24 and creates an overhead view image.

The surroundings image generation unit 811 generates a surroundings image which is an image of surrounding the vehicle 10. An example of the surroundings image is an overhead view image in which the surroundings are seen from the above. For example, the surroundings image is generated based on the overhead view image in which the captured image data captured in real time by the imaging unit 24 is converted by the viewpoint conversion unit 809. The surroundings image generation unit 811 repeatedly generates and updates the surroundings image with the lapse of the time. The surroundings image generation unit 811 outputs the generated surroundings image to the synthesized image generation unit 813.

The increase and decrease instruction acquisition unit 806 acquires an operation instruction corresponding to an instruction input by the user using the operation input unit 38, via the input interface unit 801. The operation instruction is an instruction to increase or decrease the blind area which does not display the surroundings image in the synthesized image described below. In addition, in a case where there are multiple blind areas, the increase and decrease instruction acquisition unit 806 acquires a selection instruction in which a blind area to be increased or decreased is selected among the multiple blind areas.

The blind area generation unit 807 generates a blind area. The blind area generation unit 807 sets, for example, the coordinates indicating the relative position of the blind area with respect to a vehicle image, and then, generates the blind area. As an example, in a case where the blind area has a rectangle shape, the blind area generation unit 807 sets the coordinates of four angles. The blind area corresponds to the area in front and rear of the vehicle 10 which is in a blind angle of the imaging unit 24 due to the winch 18 and the trailer hitch 20. The blind area generation unit 807 increases or decreases the blind area based on the increase instruction or decrease instruction acquired from the increase and decrease instruction acquisition unit 806. Operation instruction data, for example, is the instruction to increase or decrease the blind area. In a case where there are multiple blind areas, the blind area generation unit 807 increases or decreases the blind area selected by the selection instruction based on the increase instruction or the decrease instruction.

The synthesized image generation unit 813 acquires the surroundings image from the surroundings image generation unit 811, acquires information relating to the blind area from the blind area generation unit 807, and acquires the vehicle image which is an image of the vehicle 10. The vehicle image is an image of the vehicle 10, and is an image of at least a part of the vehicle 10. The vehicle image is captured or generated in advance and is stored in the ROM 34b or the like. The synthesized image generation unit 813 generates a synthesized image in which the surroundings image, the vehicle image, and the blind area are included. The synthesized image generation unit 813 erases the surroundings image included in the blind area by painting the blind area with a black, and then, generates the synthesized image. The synthesized image generation unit 813 outputs the generated synthesized image to the display device 36 via the display control unit 34d for displaying the synthesized image. In addition, the synthesized image generation unit 813 generates a blind area adjustment screen for acquiring the increase instruction or the decrease instruction to adjust the blind area, and displays the screen on the display device 36.

The storage unit 822 is formed, for example, in the RAM 34c. The storage unit 822 stores, for example, the blind area generated by the blind area generation unit 807 and the information relating to the synthesized image.

Figure 4:
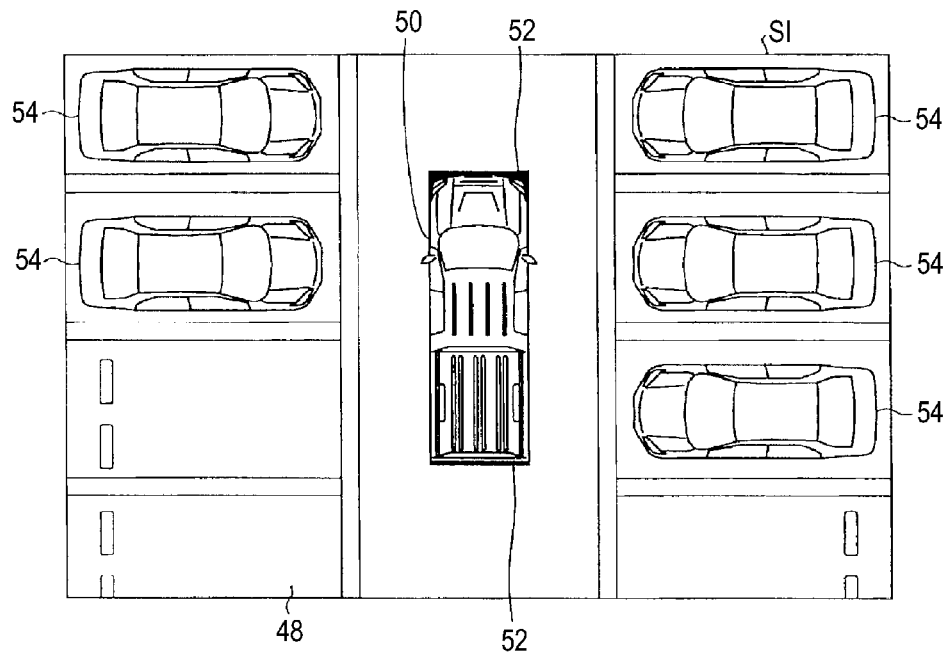
FIG. 4 is a diagram illustrating an example of a synthesized image generated by a synthesized image generation unit.

FIG. 4 is a diagram illustrating an example of the synthesized image SI generated by the synthesized image generation unit 813. As illustrated in FIG. 4, the synthesized image generation unit 813 generates the synthesized image SI in which the surroundings images 48 acquired from the surroundings image generation unit 811 and the vehicle image 50 of the host vehicle 10 are included, and the surroundings images 48 are erased by painting the blind area 52 acquired from the blind area generation unit 807 in black, and then, the images are synthesized. The surroundings images 48 include the vehicle images 54 that are an image of a road surface in the parking space and an image of other vehicles parked around the vehicle 10.

Figure 5:
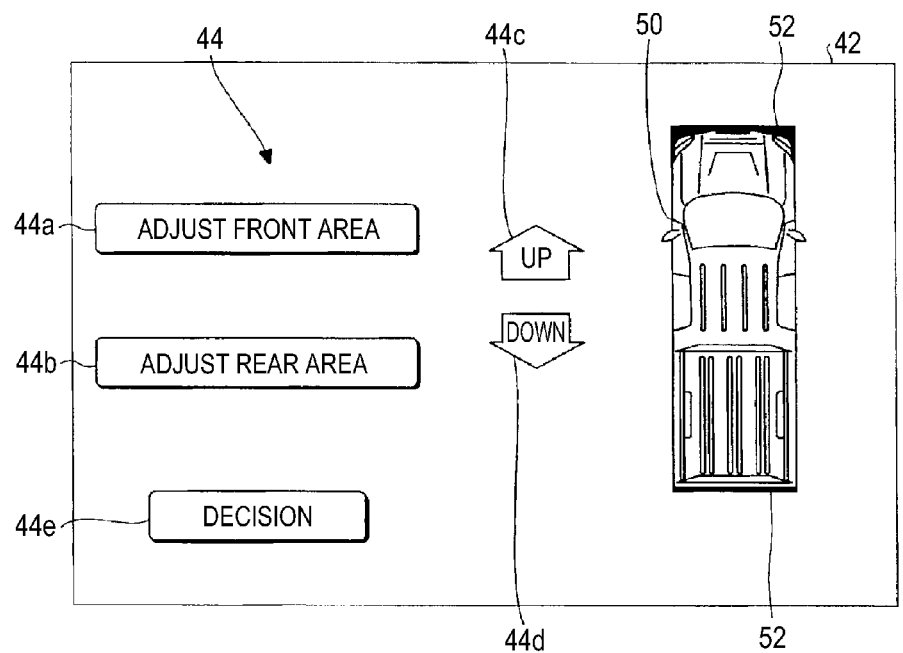
FIG. 5 is a diagram illustrating an example of a blind area adjustment screen generated by the synthesized image generation unit.

FIG. 5 is a diagram illustrating an example of the blind area adjustment screen 42 generated by the synthesized image generation unit 813. As illustrated in FIG. 5, the synthesized image generation unit 813 generates the blind area adjustment screen 42 in which multiple input buttons 44, the blind area 52, and the vehicle image 50 are included, and displays the screen on the display device 36.

The input buttons 44 include a front area adjustment button 44a and rear area adjustment button 44b that select the area of the blind area 52 to be increased or decreased among the multiple blind areas 52. The front area adjustment button 44a is operated in a case where the user inputs the selection instruction to increase or decrease the front blind area 52 among the multiple blind areas. The rear area adjustment button 44b is operated in a case where the user inputs the selection instruction to increase or decrease the rear blind area 52 among the multiple blind areas. The input buttons 44 include an up button 44c and a down button 44d. The up button 44c is selected in a case where the user inputs the increase instruction for increasing the blind area 52 in the longitudinal direction. The down button 44d is selected in a case where the user inputs the decrease instruction for decreasing the blind area 52 in the longitudinal direction. The input buttons 44 include a decision button 44e. The decision button 44e is selected in a case where the user finishes the adjustment of the blind area 52.

The synthesized image generation unit 813 increases or decreases and updates the blind area 52 displayed on the blind area adjustment screen 42 according to the instruction to increase or decrease the acquired blind area 52.

Figure 6:
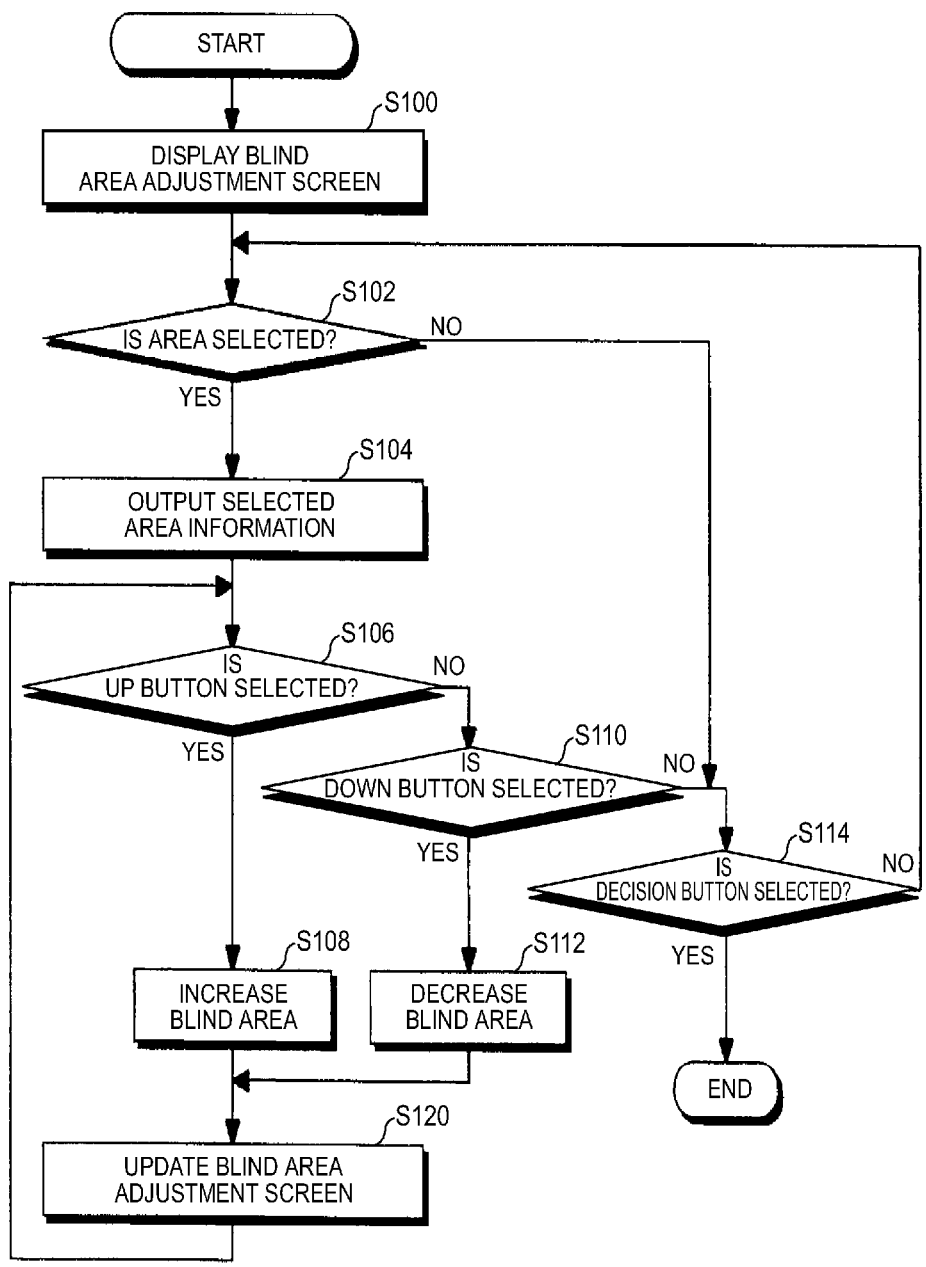
FIG. 6 is a flowchart illustrating blind area adjustment processing performed by the ECU.

FIG. 6 is a flowchart illustrating the blind area adjustment processing performed by the ECU 34. The ECU 34 executes the flowchart illustrated in FIG. 6 by reading the program for the blind area adjustment processing.

As illustrated in FIG. 6, in the blind area adjustment processing, the synthesized image generation unit 813 of the ECU 34 causes the blind area adjustment screen 42 illustrated in FIG. 5 to be displayed on the display device 36 (S100).

Next, the increase and decrease instruction acquisition unit 806 determines whether or not the area is selected (S102). When the user selects any one of the front area adjustment button 44a and rear area adjustment button 44b (Yes in S102), the increase and decrease instruction acquisition unit 806 outputs the information relating to the selected area to the blind area generation unit 807 (S104).

Next, the increase and decrease instruction acquisition unit 806 determines whether or not the user selects the up button 44c (S106). When it is determined that the user selects the up button 44c (Yes in S106), the increase and decrease instruction acquisition unit 806 outputs the increase instruction to the blind area generation unit 807.

When the increase instruction is acquired, the blind area generation unit 807 increases the blind area 52 of the area selected by the user in step S102 (S108). Specifically, the blind area generation unit 807 acquires the current blind area 52 from the storage unit 822 or the information relating to the initial value of the blind area 52, and increases the blind area 52 selected by the user in the longitudinal direction. For example, the blind area generation unit 807 increases the blind area 52 by one dot in the longitudinal direction on the screen. The blind area generation unit 807 stores the increased blind area 52 in the storage unit 822 and outputs the increased blind area 52 to the synthesized image generation unit 813.

When the information relating to the updated blind area 52 is acquired from the blind area generation unit 807, the synthesized image generation unit 813 updates the blind area 52 on the blind area adjustment screen 42 according to the updated blind area 52 (S120).

On the other hand, when it is determined that the user does not select the up button 44c (No in S106), the increase and decrease instruction acquisition unit 806 determines whether or not the user selects the down button 44d (S110). When it is determined that the user selects the down button 44d (Yes in S110), the increase and decrease instruction acquisition unit 806 outputs the decrease instruction to the blind area generation unit 807.

When the decrease instruction is acquired, the blind area generation unit 807 decreases the blind area 52 of the area selected by the user in step S102 (S112). Specifically, the blind area generation unit 807 acquires the current blind area 52 from the storage unit 822 or the information relating to the initial value of the blind area 52, and decreases the blind area 52 selected by the user in the longitudinal direction. For example, the blind area generation unit 807 decreases the blind area 52 by one dot in the longitudinal direction on the screen. The blind area generation unit 807 stores the decreased blind area 52 in the storage unit 822 and outputs the increased blind area 52 to the synthesized image generation unit 813.

When the information relating to the updated blind area 52 is acquired from the blind area generation unit 807, the synthesized image generation unit 813 updates the blind area 52 on the blind area adjustment screen 42 according to the updated blind area 52 (S120).

When it is determined that the user does not select the front area adjustment button 44a or the rear area adjustment button 44b (No in S102), or when it is determined that the user does not select the down button 44d (No in S110), the increase and decrease instruction acquisition unit 806 determines whether or not the user selects the decision button 44e (S114). When it is determined that the user does not select the decision button 44e (No in S114), the increase and decrease instruction acquisition unit 806 repeats the processes subsequent to step S102. On the other hand, when it is determined that the user selects the decision button 44e (Yes in S114), the increase and decrease instruction acquisition unit 806 ends the blind area adjustment processing.

Subsequently, in a case of generating the synthesized image SI that includes the vehicle image 50 to which the blind areas 52 illustrated in FIG. 4 are added, the synthesized image generation unit 813 generates the synthesized image SI based on the updated blind area 52.

As described above, in the ECU 34, the increase and decrease instruction acquisition unit 806 acquires the instruction to increase or decrease the blind area 52 by the user. The blind area generation unit 807 increases or decreases the blind area 52 based on the increase instruction or the decrease instruction. In this way, the synthesized image generation unit 813 can increase or decrease the blind area 52 in the synthesized image SI that includes the surroundings image. As a result, even in a case where the component such as the winch 18 and the trailer hitch 20 is added to the rear part of a vehicle 10, and the blind angle of the imaging unit 24 increases, the ECU 34 can respond to the increase by easily generating the synthesized image SI in response to the increase of the blind angle.

The ECU 34 is configured to be able to adjust the blind area 52 of the area selected by the user. In this way, the ECU 34 can adjust the blind area 52 desired by the user, and thus, it is possible to appropriately respond to the user's desire.

Second Embodiment

Figure 7:
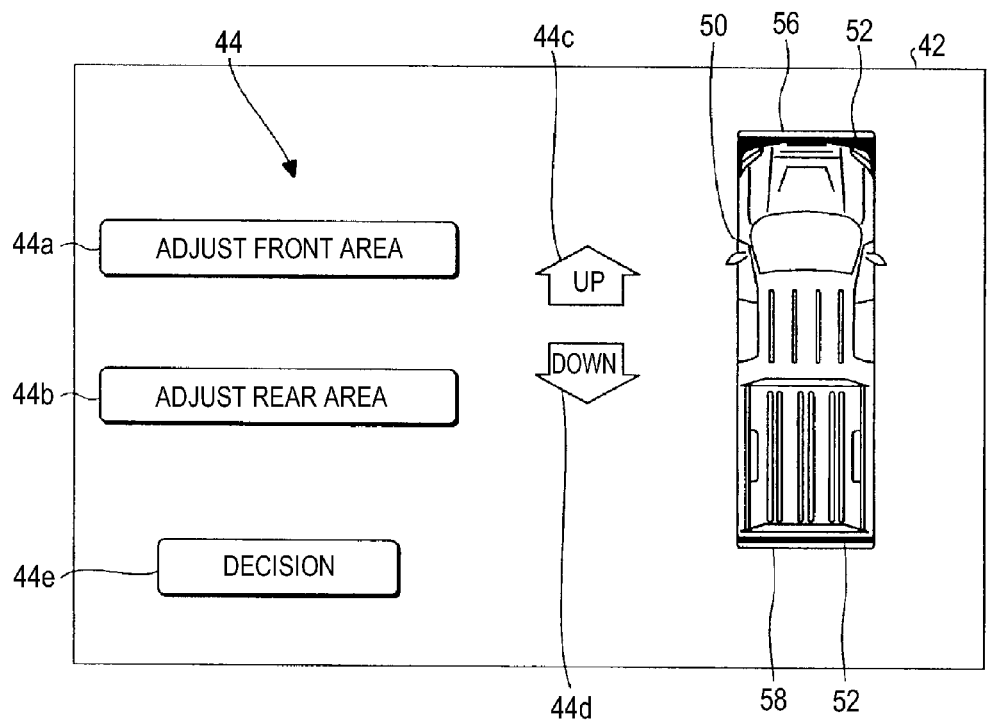
FIG. 7 is a diagram illustrating the blind area adjustment screen in a second embodiment.

FIG. 7 is a diagram illustrating a blind area adjustment screen 42 in a second embodiment. As illustrated in FIG. 7, the synthesized image generation unit 813 in the second embodiment displays the bumper images 56 and 58 which are images of bumpers 26a and 28a on each of the front and rear end portions of the vehicle image 50. Here, the synthesized image generation unit 813 generates the bumper images 56 and 58 based on the image data of the bumpers 26a and 28a that are actually captured by the imaging unit 24. The imaging unit 24 images a subject in a wide angle. Therefore, the shapes in the bumper images 56 and 58 are different from the shapes of the actual bumpers 26a and 28a respectively. The bumper images 56 and 58 cover almost every part of the blind angle of the imaging unit 24. In the second embodiment, the synthesized image generation unit 813 displays the bumper images 56 and 58 generated based on the image data of the imaged bumpers, on the blind area adjustment screen 42. In this way, the user can adjust the blind area 52 while seeing the bumper images 56 and 58 which are the major causes of the blind areas of the imaging unit 24, and thus, it is possible to appropriately adjust the blind area 52.

Third Embodiment

A third embodiment is derived in order to solve a following problem. In a case where a component such as a winch is added to the rear part of the vehicle, since the component is too close to the imaging device to be displayed on a correct position, it is not possible to appropriately cause the synthesized image to respond to the component added to the rear part of the vehicle.

Figure 8:
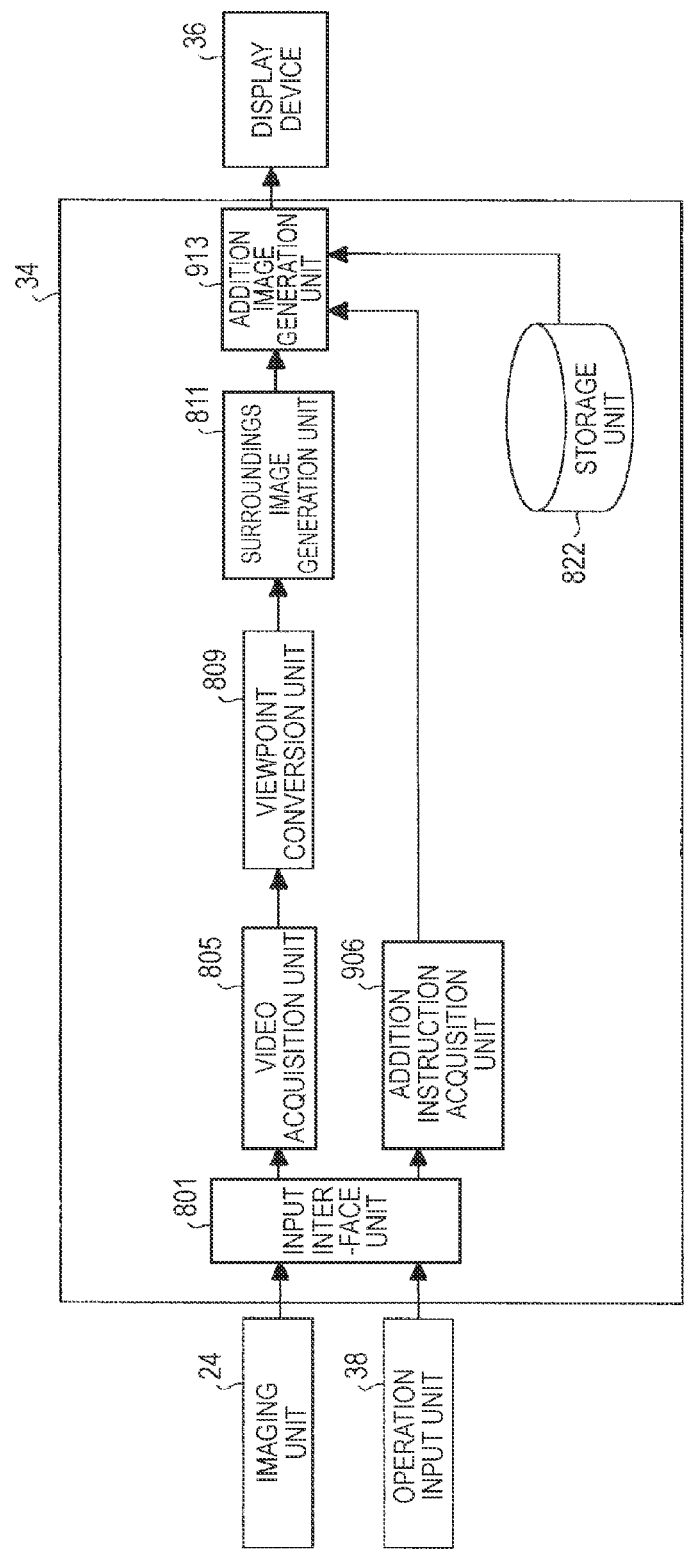
FIG. 8 is a functional block diagram illustrating a configuration of an ECU in a third embodiment.

FIG. 8 is a functional block diagram illustrating a configuration of the ECU 34 in the third embodiment. The ECU 34 is an example of the display control device. As illustrated in FIG. 8, in the ECU 34, the CPU 34a configured as the ECU 34 executes the software stored in the ROM 34b or the SSD 34f. In this way, the ECU 34 realizes an input interface unit 801, a video acquisition unit 805, a viewpoint conversion unit 809, a surroundings image generation unit 811, an addition instruction acquisition unit 906, an addition image generation unit 913, and a storage unit 822. The surroundings image generation unit 811 outputs the generated surroundings image to the addition image generation unit 913.

Here, the elements indicated with the reference signs same to those in the first embodiment are common to those in the first embodiment, thus, the description thereof will be omitted.

The addition instruction acquisition unit 906 acquires an operation instruction corresponding to an instruction input by the user using the operation input unit 38 via the input interface unit 801. The operation instruction is, for example, an addition instruction for adding a component image to the synthesized image as described below. The component image means the images corresponding to the components such as the winch 18 and the trailer hitch 20 added to the rear part of the vehicle. The component image is generated in advance using a technology such as a computer graphics (CG) and is stored in the ROM 34b. The addition instruction acquisition unit 906 acquires a selection instruction in which the blind area overlapping the component image is selected among the multiple blind areas in a case where there are multiple blind areas as described below. The addition instruction acquisition unit 906 acquires a change instruction to change a position of the added component image.

The addition image generation unit 913 acquires the surroundings image from the surroundings image generation unit 811 and acquires the information relating to the blind area and the vehicle image that is the image of the vehicle 10 from the storage unit 822. The vehicle image is an image of the vehicle 10 and at least an image of a part of the vehicle 10. The vehicle image is, for example, imaged or generated in advance and is stored in the ROM 34*b*. The blind area means an area of which the surroundings image is not displayed. The information relating to the blind area is, for example, information indicating relative coordinates of the blind area with respect to the vehicle image. Specifically, the information relating to the blind area means the coordinates of four angles of the blind area in a case where the blind area is a rectangle. The addition image generation unit 913 generates a synthesized image that includes the surroundings image, the vehicle image, and the blind area. The addition image generation unit 913 erases the surroundings image included in the blind area by, for example, painting the blind area in black, and generates the synthesized image.

In addition, the addition image generation unit 913 causes at least a part of the component image to overlap the blind area based on an addition instruction, and then, generates the synthesized image by adding the component image. For example, the addition image generation unit 913 overlappingly adds the component image on the blind area selected according to the selection instruction. Furthermore, the addition image generation unit 913 changes the position of the component image in the synthesized image according to the change instruction to change the position of the component image. The addition image generation unit 913 outputs the generated synthesized image to the display device 36 via the display control unit 34*d* and displays the synthesized image. In addition, the addition image generation unit 913 generates an addition screen for acquiring the addition instruction to add the component image and displays the addition screen on the display device 36.

Figure 9:
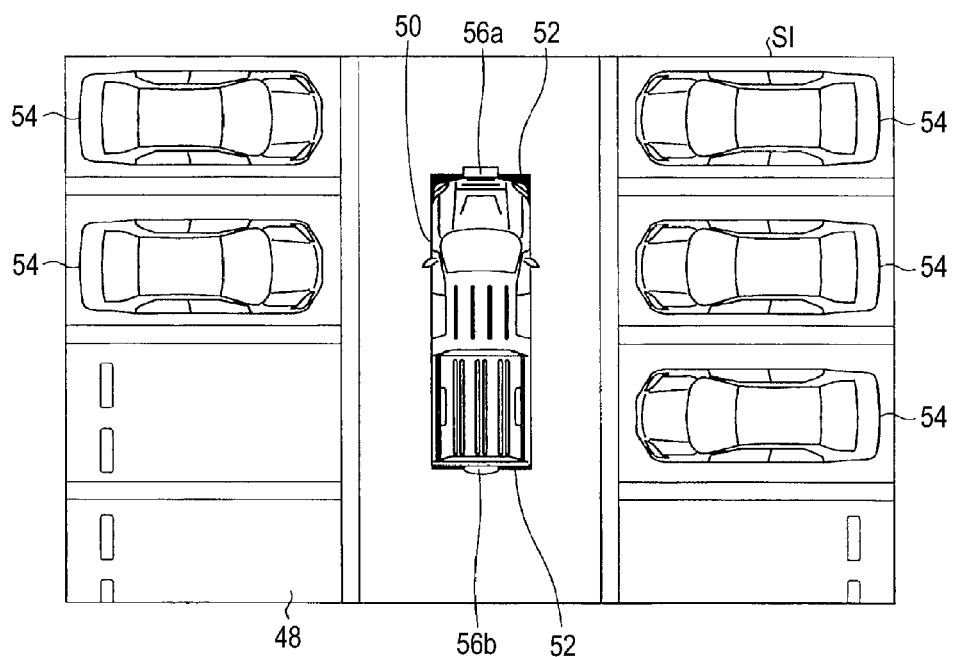
FIG. 9 is a diagram illustrating an example of a synthesized image generated by an addition image generation unit in the third embodiment.

FIG. 9 is a diagram illustrating an example of a synthesized image SI generated by the addition image generation unit 913. As illustrated in FIG. 9, the addition image generation unit 913 generates the synthesized image SI in which the surroundings images 48 acquired from the surroundings image generation unit 811 and the vehicle image 50 of the host vehicle 10 are included, and the surroundings images 48 are erased by painting the blind area 52 acquired by the storage unit 822 in black, and then, the images are synthesized. The surroundings images 48 include the vehicle images 54 that are an image of a road surface in the parking space and an image of other vehicles parked around the vehicle 10. Furthermore, the addition image generation unit 913 adds the component image 56*a* corresponding to the winch 18 and the component image 56*b* corresponding to the trailer hitch 20 to the synthesized image according to the addition instruction. In a case where the component images 56*a* and 56*b* are not needed to be distinguished, the reference sign of the component image will be referred to as "56'.

Figure 10:
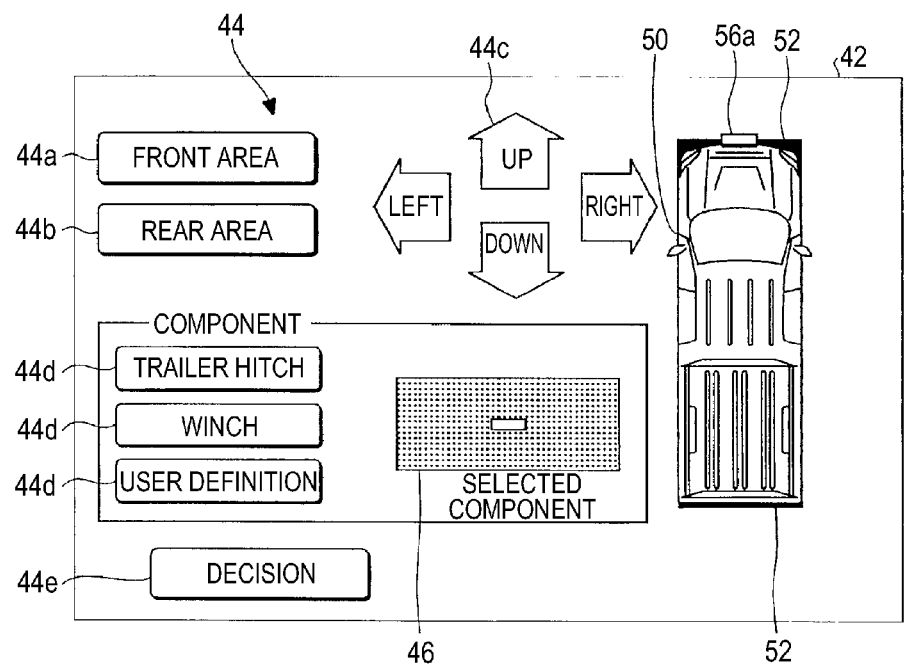
FIG. 10 is a diagram illustrating an example of an addition screen generated by the addition image generation unit in the third embodiment.

FIG. 10 is a diagram illustrating an example of an addition screen 42 generated by the addition image generation unit 913. As illustrated in FIG. 10, the addition image generation unit 913 generates the addition screen 42 in which multiple input buttons 44, the selected component image 46, the blind area 52, and the vehicle image 50 are included, and displays the screen on the display device 36.

The input buttons 44 include a front area button 44*a* and rear area button 44*b* that select the area to add the component image 56 among the multiple blind areas 52. The front area button 44*a* is operated in a case where the user input the selection instruction to add the component image 56 to the front blind area 52 among the multiple blind areas. The rear area button 44*b* is operated in a case where the user inputs the selection instruction to add the component image 56 to the rear blind area 52 among the multiple blind areas. The input buttons 44 include multiple (for example, four) position change buttons 44*c* that change the position of the component image 56. The position change buttons 44*c* are operated in a case where the user moves the component image 56 to any one of upward, downward, right, and left directions.

The input buttons 44 include multiple (for example, three) component selection buttons 44*d*. The component selection buttons 44*d* are operated in a case where the user selects any one of the multiple component images 56 corresponding to the multiple components. The addition instruction acquisition unit 906 acquires the addition instruction by the component selection buttons 44*d* being operated. For example, in a case where the user selects any one of the component image 56*a* corresponding to the winch 18, the component image 56*b* corresponding to the trailer hitch 20, or the component image defined by the user, any one of the component selection buttons 44*d* is selected. When the addition instruction is input through the component selection buttons 44*d*, the addition image generation unit 913 adds the selected component image 56 on the blind area 52 on the addition screen 42 according to the addition instruction.

The input buttons 44 include the decision button 44*e*. The selected component image 46 is displayed on the right side of the component selection buttons 44*d*. The selected component image 46 displays the component images 56*a* and 56*b* selected by the component selection buttons 44*d*. The decision button 44*e* is selected in a case where the user finishes the addition of the component images 56*a* and 56*b*.

Figure 11:
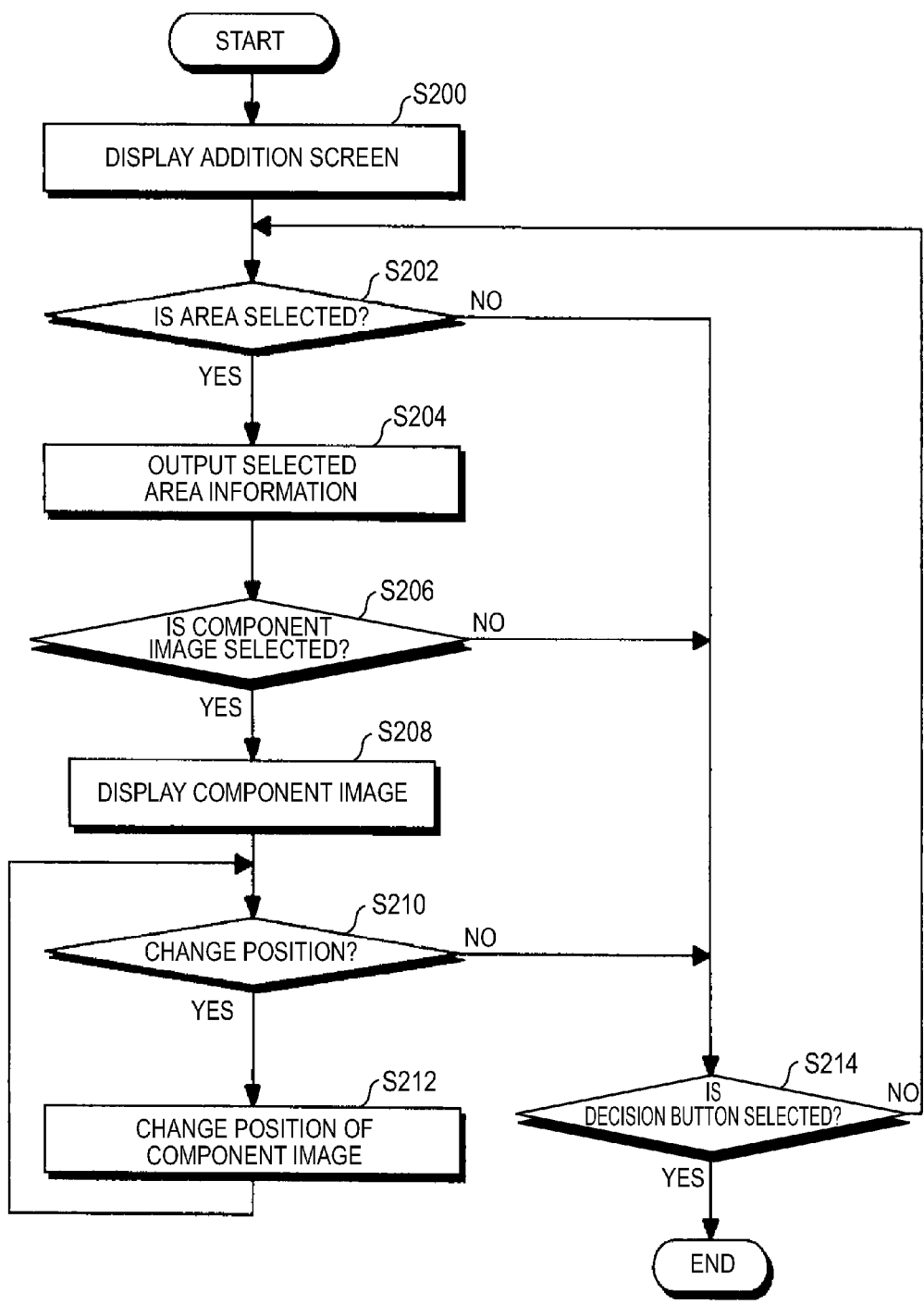
FIG. 11 is a flowchart illustrating component image addition processing performed by the ECU.

FIG. 11 is a flowchart illustrating component image addition processing performed by the ECU 34. The ECU 34 executes the flowchart illustrated in FIG. 11 by reading the program for the component image addition processing.

As illustrated in FIG. 11, in the component image addition processing, the addition image generation unit 913 of the ECU 34 causes the addition screen 42 illustrated in FIG. 10 to be displayed on the display device 36 (S200). The addition image generation unit 913 does not display the component image 56 on the first addition screen 42.

The addition instruction acquisition unit 906 determines whether or not the area is selected (S202). When the user selects any one of the front area button 44*a* or the rear area button 44*b* (Yes in S202), the addition instruction acquisition unit 906 outputs the information relating to the selected area to the addition image generation unit 913 (S204).

The addition instruction acquisition unit 906 determines whether or not any one of the component images 56 is selected (S206). When the user selects any one of the component selection buttons 44*d* (Yes in S206), the addition instruction acquisition unit 906 outputs the information relating to the selected component image 56 to the addition image generation unit 913.

The addition image generation unit 913 adds the component image 56 selected by the user to the area selected in S202 and displays the result (S208). In the example illustrated in FIG. 10, the addition image generation unit 913 adds the component image 56 to the front blind area 52. When adding the component image 56, the addition image generation unit 913 determines the position of the component image 56 in the blind area 52 selected by the user based on the initial value stored in the storage unit 82*2*.

The addition instruction acquisition unit 906 determines whether or not any one of the position change buttons 44*c* is selected and whether or not to change the position of the component image 56 (S210). When the user selects any one of the position change buttons 44*c*, the addition instruction acquisition unit 906 determines to acquire the selection as the change instruction and to change the position (Yes in S210). The addition instruction acquisition unit 906 outputs the information relating to the selected position change buttons 44*c* to the addition image generation unit 913 as the change instruction.

The addition image generation unit 913 changes the position of the component image 56 based on the position change buttons 44*c* selected by the user (S212). For example, when the user selects the position change buttons 44*c* of "UP", the addition image generation unit 913 moves the component image 56 to the upper side in the addition screen 42. Subsequently, step S210 is repeated.

When the user does not select any one in steps S202, S206, and S210 (No in S202, No in S206, and No in S210), the addition instruction acquisition unit 906 determines whether or not the decision button 44*e* is selected (S214). When the user does not select the decision button 44*e* (No in S214), the addition instruction acquisition unit 906 repeats the processes subsequent to step S202. On the other hand, when the user selects the decision button 44*e* (Yes in S214), the addition instruction acquisition unit 906 ends the component image addition processing.

Subsequently, when displaying the synthesized image SI, the addition image generation unit 913 displays the selected component image 56 at the set and changed position on the addition screen 42.

As described above, the ECU 34 according to the third embodiment can add the selected component image 56 to the synthesized image SI by the user. Therefore, the synthesized image SI can easily respond to the components such as the winch 18 added to the rear part of the vehicle 10.

The ECU 34 can add the component image 56 on the blind area 52 selected by the user among the multiple blind areas 52. Therefore, it is possible to display the component image 56 at the position corresponding to the position of the added component on the vehicle 10.

The ECU 34 displays the added component image 56 on the addition screen 42. Therefore, the user can appropriately add the component image 56.

The ECU 34 changes the position of the component image 56 on the addition screen 42 according to the change instruction to change the position input by the user. Therefore, it is possible to display the component image 56 at the appropriate position.

The embodiments of this disclosure are described. However, those embodiments are present as examples and are not intended to limit the scope of the disclosure. These new embodiments can be embodied in various other forms, and various omissions, replacements, or changes can be performed thereon without departing from the spirit of the disclosure. These embodiments and the modifications are included in the scope and the spirit of the disclosure, and are included in the appended claims appended hereto and the scope of their equivalents.

For example, the configurations of the embodiments described above may appropriately be changed. In addition, the connection relationships of the configurations of the embodiments described above may appropriately be changed. The order of steps in the flowcharts in the embodiments described above may appropriately be changed.

For example, in the first and second embodiments described above, the blind area 52 is painted in black. However, the blind area 52 may be painted in grey or may be indicated as frames surrounded by lines.

In addition, in the third embodiment described above, the shape of the blind area 52 is fixed. However, the shape of the blind area 52 may be changed. For example, the shape of the blind area 52 may be changed by the user's input or the shape of the blind area 52 may be changed according to the component image 56 selected by the user.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
    an increase and decrease instruction acquisition unit that acquires an increase instruction or a decrease instruction to increase or decrease a blind area in which a surroundings image is not displayed in a synthesized image including a vehicle image which is an image of a vehicle and the surroundings image which is an image of the surroundings of the vehicle;
    a blind area generation unit that increases or decreases the blind area based on the increase instruction or the decrease instruction; and
    a synthesized image generation unit that generates a synthesized image including the blind area, the vehicle image, and the surroundings image.

2. The display control device according to claim 1,
    wherein the increase and decrease instruction acquisition unit acquires a selection instruction in which the blind area to be increased or decreased is selected among a plurality of blind areas, and
    wherein the blind area generation unit increases or decreases the blind area selected by the selection instruction.

3. The display control device according to claim 1,
    wherein the synthesized image generation unit causes the blind area and the vehicle image to be displayed on a blind area adjustment screen for acquiring the increase instruction or the decrease instruction to increase or decrease the blind area.

4. The display control device according to claim 3,
    wherein the synthesized image generation unit increases or decreases the blind area displayed on the blind area adjustment screen according to the acquired increase instruction and the decrease instruction.

5. The display control device according to claim 1, further comprising:
    an addition instruction acquisition unit that acquires an addition instruction to add a component image on the blind area; and
    an addition image generation unit that generates a synthesized image in which at least a part of the component image is overlappingly added on the blind area based on the addition instruction.

6. The display control device according to claim 5, wherein the addition instruction acquisition unit acquires the selection instruction in which the blind area overlapping the component image is selected among the plurality of blind areas, and
wherein the addition image generation unit overlaps the component image on the blind area selected by the selection instruction.

7. The display control device according to claim 5, wherein the addition image generation unit causes the blind area and the vehicle image to be displayed on an addition screen for acquiring the addition instruction to add the component image.

8. The display control device according to claim 7, wherein the addition image generation unit adds the component image on the blind area in the addition screen according to the acquired addition instruction.

9. The display control device according to claim 5, wherein the addition instruction acquisition unit acquires a change instruction to change a position of the component image, and
wherein the addition image generation unit changes the position of the component image in the synthesized image according to the change instruction.

10. The display control device according to claim 1, wherein the synthesized image generation unit generates a blind area adjustment screen, and
the adjustment screen includes an input button which is operated in a case where a user inputs the increase instruction or the decrease instruction.

11. A display control device comprising:
an addition instruction acquisition unit that acquires an addition instruction to add a component image on a blind area in a synthesized image including a vehicle image which is an image of a vehicle, the surroundings image which is an image of the surroundings of the vehicle, and the blind area in which the surroundings image is not displayed; and
an addition image generation unit that generates a synthesized image in which at least a part of the component image is overlappingly added on the blind area based on the addition instruction, wherein the component image is an image generated in advance to correspond to a component which is added to the vehicle.

12. The display control device according to claim 11, wherein the addition instruction acquisition unit acquires a selection instruction in which the blind area overlapping the component image is selected among a plurality of blind areas, and
wherein the addition image generation unit overlaps the component image on the blind area selected by the selection instruction.

13. The display control device according to claim 11, wherein the addition image generation unit causes the blind area and the vehicle image to be displayed on an addition screen for acquiring the addition instruction to add the component image.

14. The display control device according to claim 13, wherein the addition image generation unit adds the component image on the blind area in the addition screen according to the acquired addition instruction.

15. The display control device according to claim 13, wherein the addition screen includes an input button which is operated in a case where a user inputs the addition instruction.

16. The display control device according to claim 11, wherein the addition instruction acquisition unit acquires a change instruction to change a position of the component image, and
wherein the addition image generation unit changes the position of the component image in the synthesized image according to the change instruction.

\* \* \* \* \*